(12) United States Patent
Webber et al.

(10) Patent No.: US 6,347,777 B1
(45) Date of Patent: Feb. 19, 2002

(54) SEAT ADJUSTMENT APPARATUS

(75) Inventors: Randall T. Webber, San Diego; George M. Zink, Escondido; Christopher E. Brennan, El Cajon, all of CA (US)

(73) Assignee: Hoist Fitness Systems, San Diego, CA (US)

( * ) Notice: Subject to any disclaimer, the term of this patent is extended or adjusted under 35 U.S.C. 154(b) by 0 days.

(21) Appl. No.: 09/495,778

(22) Filed: Feb. 1, 2000

(51) Int. Cl.[7] .................................................. A47F 5/00
(52) U.S. Cl. ..................... 248/354.1; 74/469; 74/551.1; 248/188.5
(58) Field of Search ........................... 248/354.1, 354.3, 248/354.4, 354.5, 161; 403/104; 74/469, 551.1, 551.2, 551.3

(56) References Cited

U.S. PATENT DOCUMENTS

| | | | | |
|---|---|---|---|---|
| 1,303,416 A | * | 5/1919 | Tidyman | 182/155 |
| 3,704,850 A | * | 12/1972 | Hendrickson et al. | 248/188.5 |
| 3,780,974 A | * | 12/1973 | Takahashi | 248/411 |
| 4,185,936 A | * | 1/1980 | Takahashi | 403/104 |
| 4,586,399 A | | 5/1986 | Kassai | |
| 4,596,484 A | * | 6/1986 | Nakatani | 403/104 |
| 4,695,028 A | * | 9/1987 | Hunter | 248/354.1 |
| 4,761,092 A | * | 8/1988 | Nakatani | 403/104 |
| 4,928,916 A | * | 5/1990 | Molloy | 248/354.1 |
| 5,625,923 A | | 5/1997 | Huang | |
| 5,887,490 A | | 3/1999 | Dittmar | |
| 6,032,914 A | * | 3/2000 | Bastida | 248/354.1 |

* cited by examiner

Primary Examiner—Leslie A. Braun
Assistant Examiner—Tan Le
(74) Attorney, Agent, or Firm—Brown, Martin, Haller & McClain LLP

(57) ABSTRACT

An adjustment apparatus for adjusting the position of a back pad or seat pad of a seat has an inner tube with a series of spaced openings for securing at one end to the back or seat pad, and an outer tube telescopically engaged over the inner tube and secured to a support frame of the seat. The outer tube has a pinning opening for alignment with a selected one of the openings in the inner tube. A lever is pivotally secured on a pivot bracket on the outer tube for rotation about a pivot axis with a first end portion of the lever projecting over the pinning hole, and a pinning button projecting from the first end portion towards the pinning hole. The lever is movable between an operative position in which the pinning button extends through the pinning hole and an aligned hole in the inner tube to secure the tubes together, and a retracted position in which the pinning button is spaced from the pinning hole. The width of the lever is greater than that of the pivot bracket, so that the lever extends over and completely covers the pivot bracket, avoiding potential pinch areas.

24 Claims, 3 Drawing Sheets

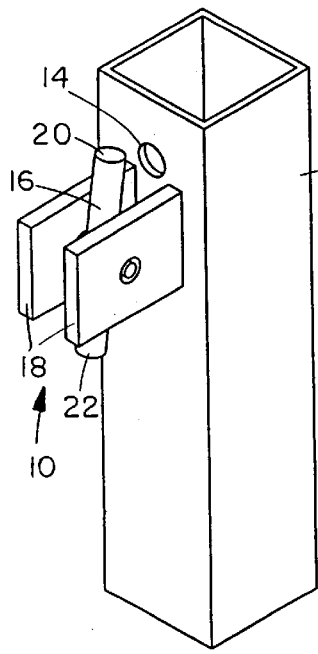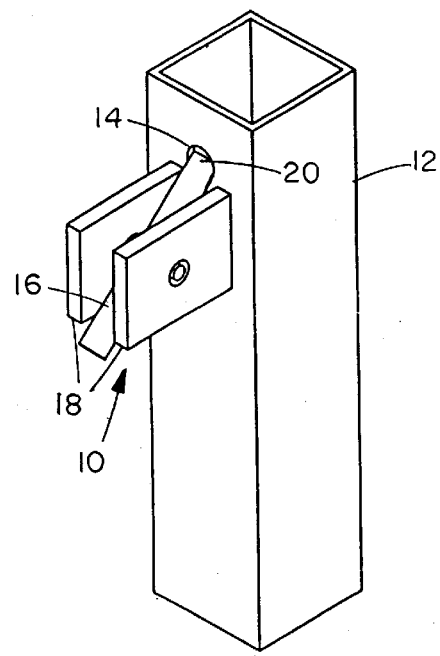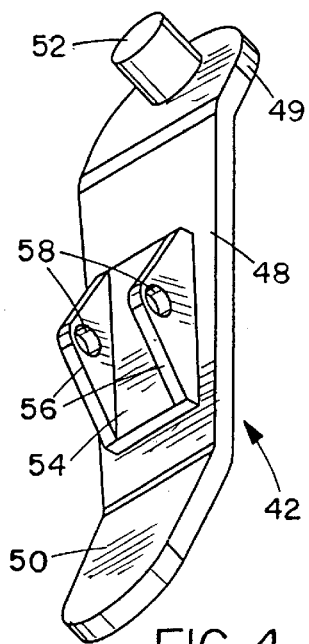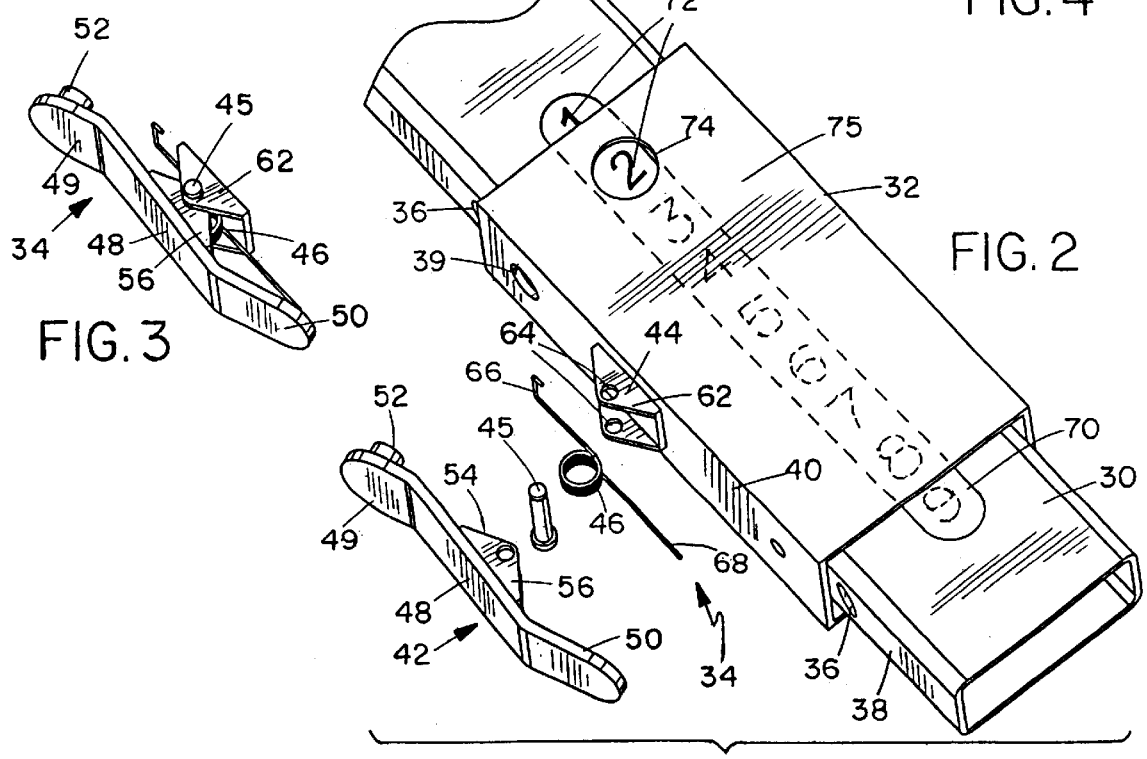
FIG. 1A PRIOR ART
FIG. 1B PRIOR ART
FIG. 4
FIG. 3
FIG. 2

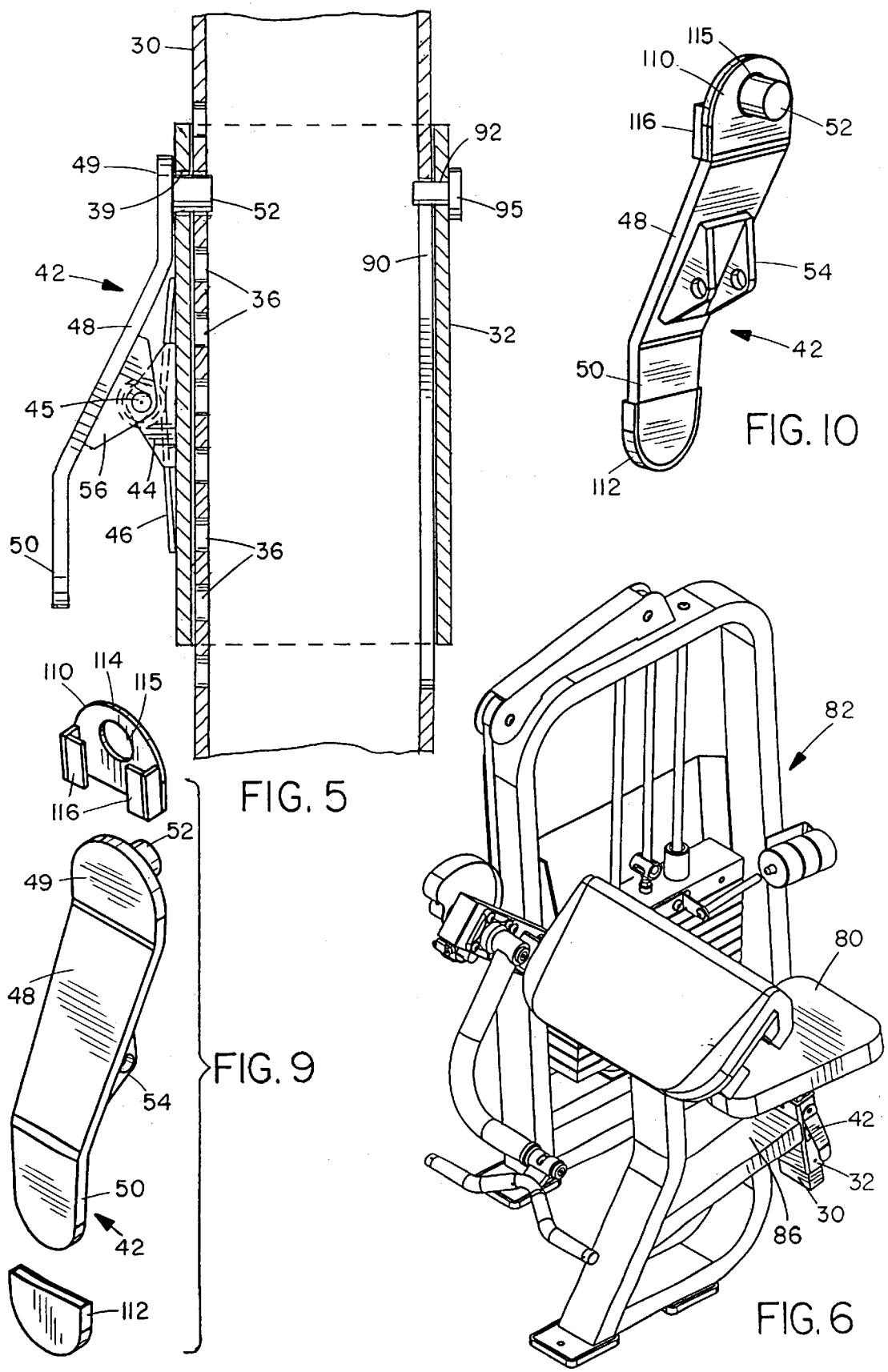

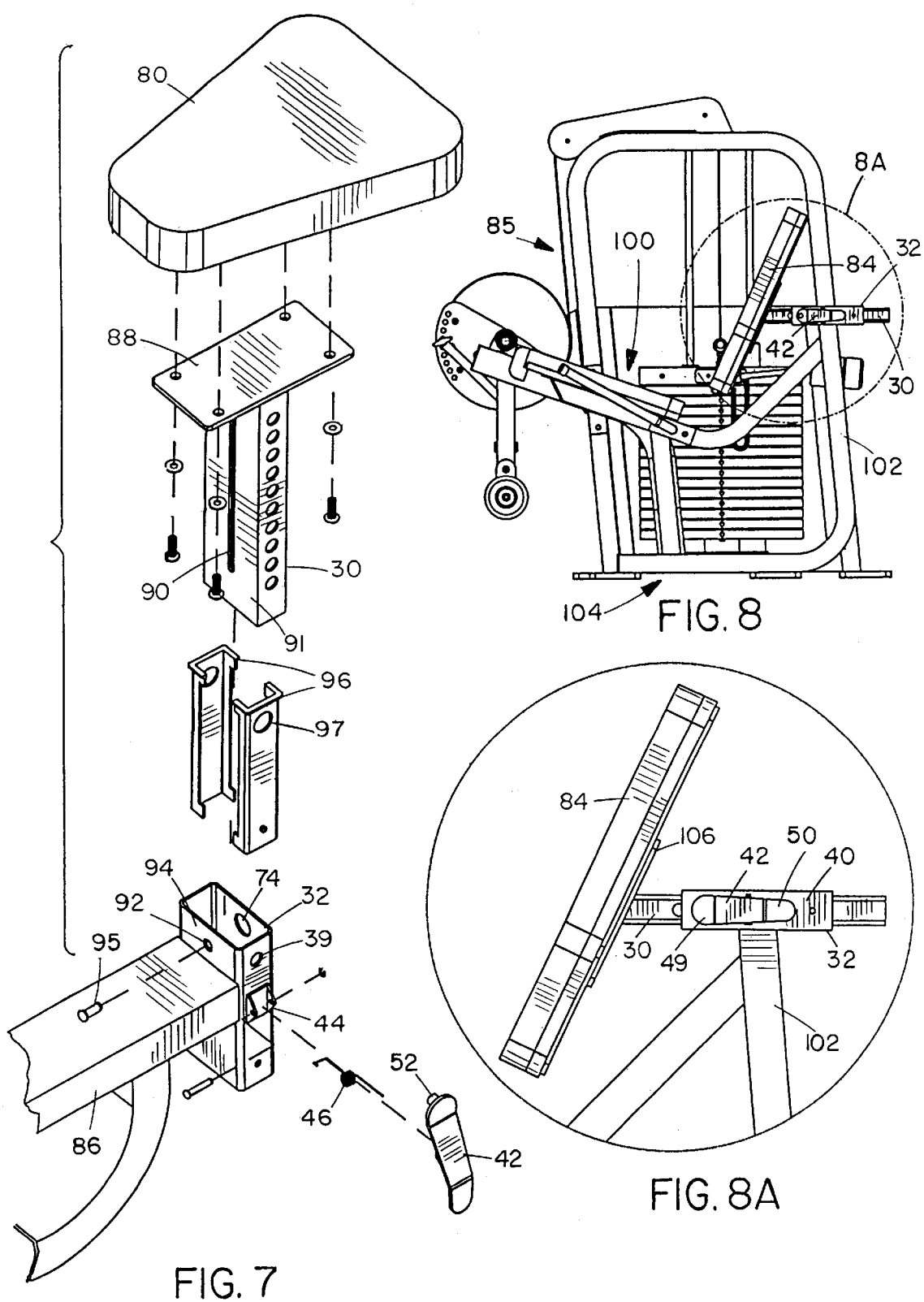

SEAT ADJUSTMENT APPARATUS

BACKGROUND OF THE INVENTION

The present invention relates generally to seats with adjustable back pads and seat pads, and is particularly concerned with an adjustment apparatus for adjusting the position of a seat pad and/or a back pad of a seat in order to accommodate users of various shapes and sizes.

Seats used in exercise machines, or as office chairs or the like, normally have adjustable seat pads and back pads so that the user can tailor the seat to accommodate their specific needs. Such adjustability is particularly useful for seats used in exercise machines for supporting a seated exerciser while performing exercises, because of the different sizes and shapes of the users and also because different seat and back pad positions may be preferable for performing different types of exercises. The adjustment device or apparatus must be convenient, durable, and safe, both in the office and in the health club environment, and in any other applications where an adjustable seat is required.

There are two major, known types of seat adjusters, those with fixed incremental settings and those without fixed increments (infinite adjusters). Adjusters without fixed increments provide infinite adjustments that allow the user to place the seat and back pads anywhere along the adjustment path. In theory, this type of adjuster should be preferable since the user does not have to locate a fixed setting when making an adjustment.

Three types of infinite adjusters are known in seats for exercise machines. The first type uses a threaded tension knob to apply pressure in order to hold the adjusting pad in place. The pad is mounted on one of two telescoping tubes. The user turns the knob to secure or release the pad-mounted tube. This is both easy to use and inexpensive, but has several disadvantages. First, the same adjustment must be made for movement in either direction. The threaded end of the adjustment knob mars the finish on the adjuster tube, and severe over-tightening can strip the threads and require replacement. If the knob loosens during use, the seat can slip, which could cause injury to the user. In commercial applications or health clubs, it is common for one user to over-tighten the knob so that it is difficult or impossible for subsequent users to loosen it. Additionally, adjustment locations cannot be easily documented and repeated. It is almost impossible for a user to place the seat in the same position every time. Because the adjustments are infinite and not fixed, the seat position cannot be accurately recorded. It is important when exercising to know your positioning on each piece of equipment. Full range of motion, amount of pre-stretch, and axis of rotation positioning are all determined by seat pad and back pad positioning. If the user is not in the proper position, they will not receive the full benefit from the exercise and could risk potential injury.

The second type of infinite adjuster uses leverage and the weight of the seat itself to secure the seat, by wedging it in place on the adjusting upright. The same type of adjustment is made for movement in either direction. In order to raise or lower the seat pad, user's must lift the front end of the seat upward, releasing the weight of the seat. It can then slide up and down on the adjusting upright. One problem with this design is that, once tension is released, gravity and the weight of the seat can make it hard to control. The user must be paying attention and use both hands, or the seat could fall. If the front end of an unoccupied seat is accidentally bumped into, the seat could drop and damage the equipment or cause injury. This is a safety liability. This type of adjuster also has the problem of position identification and repeatability of a seat position.

The assisted adjuster is the third type of infinite adjustment mechanism. It utilizes a spring or gas shock to lift the seat automatically. While this works well in one direction, it requires the user's body weight to apply force against the assisting device and move the seat in the opposite direction. Because of this, the user can only make adjustments when seated. This design is more expensive to produce and maintain or service. It also has the same problem as the first two types of infinite adjusters with position identification and repeatability. The same type of adjustment is required for movement in either direction.

Fixed incremental adjusters, while offering fewer adjustment positions, are more secure, and have the ability to accurately identify optimum seat positions for future use. These adjusters utilize a direct pinning system to lock the seat pad or back pad in place. There are generally four types of fixed adjuster.

The first type of fixed adjuster utilizes a straight through pin to lock two pieces of telescoping tubing together. A single through hole in the outer tube is lined up with one of a series of through holes in the inside tube, and the pin is inserted through both holes. This is a simple and effective way to lock the seat in place. Because the pad is secured in position, its position can easily be identified and repeated. The same procedure is used to adjust the pad in either direction. The disadvantage with this design is that the pin can work itself loose and back out. This will cause the seat to drop and can cause serious injury. Because the pin is not attached to the equipment, it is easily misplaced, making the equipment inoperable.

The second type of fixed adjuster uses a spring-loaded pull pin to replace the straight pin. In this design, a hole is drilled in the outer of two telescoping tubes and the pull pin "barrel" is welded over it. A series of holes are provided in the inner tube. The pull pin, which is a spring-tensioned plunger with a knob on one end, is secured inside the barrel. The pull pin is pulled back against the spring, the inner telescoping tube is adjusted to the desired position, and the pull pin is released. The pad is then held securely in place and the spring tension prevents the pin from working loose. Misplacement of the pin is not a problem. The pad positioning is easily identified and repeated. One disadvantage to this type of fixed adjuster is that the user must use both hands to control the pad and pull the pull pin at the same time. This generally means that, when adjusting a seat or back pad, the user must get up from the seat in order to reach and control both the pad and the pull pin. This can be annoying, particularly when such an adjuster is used on multi-function exercise machines such as home gyms, which require constant adjusting of pads when switching from one exercise to another.

The third type of fixed adjuster is known as a twist and lift system. In this system, a round outer telescoping tube has a central channel machined along a portion of its length facing inwardly, with a series of spaced, downward angled slots running from one side of the channel. The round inner tube has a pin or bolt protruding outwardly and captured in the channel. The pin engages in one of the slots to lock the pad in a selected position. In order to adjust the pad position, the user must twist and lift the pad, which in turn twists and lifts the pin and slides it out of the slot and into the channel. From there, the pad can be adjusted up or down to the desired position, and twisted back down so that the pin engages in another slot. This is quick and simple, usually requiring only one hand, and the positions can easily be identified and repeated. The same procedure is used for adjustment in either direction. Because the system can only be used with round tubing, it is difficult and expensive to machine the channel and slots in the tube radius, and to position the pad square to the frame. Another disadvantage is the limited number of possible positions, and the increased distance between these positions as compared to other types of adjuster. A further disadvantage is that, if an unoccupied seat is accidentally bumped in a sideways direction, the pin may slide into the central channel, and the seat will then fall. Again, this could damage the frame of the machine or cause injury.

The fourth type of fixed adjuster is a ratcheting, lever system. It consists of a lever that is pivotally mounted to the outer telescoping tube and has a first end that protrudes through a hole in the outer tube to engage one of a series of holes in the inner telescoping tube. The lever is pivoted at a point between its first and second ends, and is designed to ratchet or automatically disengage from the inner tube when the pad is moved in a first direction, yet instantly pin the inner tube and secure the pad from movement in a second direction. When the pad is moved in the first direction, the following edge of an inner tube pinning hole engages the first end of the lever, forcing it to pivot out of the way and allowing the tube to adjust. The lever is weighted or tensioned so as to always remain in contact with the inner tube. This allows the first lever end to briefly engage each pinning hole as It passes, and to seat instantly into a pinning hole when the inner tube and pad stop. Because the lever is designed to pivot in one direction only, movement by the pad in a second direction wedges the leading edge of an inner tube pinning hole against the first or protruding end of the lever, securing the pad in place. To move the pad in the second direction, the lever is pivoted out of the hole by depressing its second end, disengaging the lever end from the inner tube and allowing the pad to be adjusted.

This ratcheting adjustment system combines the best features in other known adjusters. It has the ease and convenience of assisted adjusters. It can be adjusted with one hand (in one direction) like the twist and lift system, the pinning device is permanently attached, like the pull-pin system, and the pad position can be identified and repeated.

The ratcheting lever adjustment system also has several other advantages over other types of seat adjuster. First, the pad is designed to be adjusted by the user whether in or out of the exercise position. All fixed incremental adjusters allow the user to easily determine the number of position changes needed for proper pad placement. The user simply looks at the position marking and moves the pad accordingly. However, with a straight pin or pull pin, doing this is extremely difficult, if not impossible, from a seated position. The user would have to bend over to see the position marking when adjusting a seat pad, or twist around when adjusting the back pad, shift to take weight off the pad, pull the adjusting pin with one hand and the pad with the other hand, while simultaneously watching the position markings to make sure the proper position is achieved. Such a maneuver is difficult and uncomfortable to achieve. In contrast, with the ratcheting adjustment system, the lever always stays in contact with the adjusting inner tube, and the user can determine the number of position adjustments needed and count the number of "clicks" as the lever ratchets over each hole, without having to bend over or twist around to view the actual position markings.

Another advantage is ease of adjustment. Grasping and pulling a straight pin or pull pin, or squeezing a handle, can be difficult for users with a handicap, arthritis, or in rehab for a hand injury. With the ratchet system, the user can pull the pad when adjusting in one direction and then simply press down on the ratchet lever, using the knuckles, back, or heel of the hand or the wrist to adjust in the opposite direction. This eliminates the need to grip and pull a pin.

Existing ratcheting lever adjustment systems still have some disadvantages. In some known lever adjusters, the lever is mounted to pivot between two plates mounted on the outer telescoping tube. This is a safety liability because it creates a potential pinch area between the lever and each plate. The risk of pinching is compounded when the lever is spring-loaded to snap back into position when released. The lever is typically relatively short and narrow, providing limited contact area for the hands and potentially causing discomfort to the user.

SUMMARY OF THE INVENTION

It is an object of the present invention to provide a new and improved adjustment apparatus particularly suitable for adjusting the position of a seat pad or back pad of a seat or chair.

According to the present invention, an adjustment apparatus is provided which comprises an inner tube and an outer tube telescopically engaged over the inner tube, the inner tube having a series of spaced openings and the outer tube having a pinning opening for alignment with a selected one of the openings in the inner tube, a pivot bracket mounted on the outside of the outer tube at a location spaced a predetermined distance from the pinning opening, and a lever having a central portion pivotally secured over the pivot bracket and opposite first and second end portions projecting in opposite directions from the central portion, the lever having a transverse width greater than the width of the pivot bracket, the first end portion of the lever projecting over the pinning hole, a retaining pin projecting from the first end portion towards the pinning hole, and the lever being movable between an operative position in which the retaining pin extends through the pinning hole and an aligned hole in the inner tube to secure the tubes together, and a retracted position in which the retaining pin is spaced from the pinning hole, and a biasing device urging the lever towards the operative position, the second end portion of the lever comprising a handle portion for pressing by a user to release the inner tube from the outer tube to permit relative movement between the tubes.

The adjustment apparatus may be used for any application where adjustment of the position of a first member relative to a second member is desired, but is primarily intended for adjusting the position of a seat pad or back pad of a seat, for example a seat used on an exercise machine. In this case, one of the tubes is secured to a seat pad or back pad, while the other tube is secured to part of a fixed support frame for the seat or exercise machine. The same adjustment apparatus may be used for both the seat pad and back pad.

Since the lever is pivoted on top of the pivot bracket, rather than between two spaced pivot plates, and has a width greater than the width of the pivot bracket, it will completely cover the pivot bracket at all times and avoid possible pinch areas. The lever hides the pivot mounting system from view, and allows a user's hand to comfortably make contact with the lever at any position without encountering any potential pinch area. The width of the lever is such that it can be operated by parts of the hand other than the fingers, for individuals having only limited use of their fingers.

In a preferred embodiment of the invention, the lever comprises a relatively broad, plate-like member having a flat central portion. The first end portion is angled upwardly from the central portion, and the second end portion is angled downwardly from the central portion at the same angle as the first end portion, so that the end portions are parallel to one another. The retaining pin extends perpendicular to the first end portion. The angles are such that, when the lever is in the operative position, the first end portion will be flat against the outer tube and the retaining pin will extend transversely through the aligned openings in the outer and inner tube, so that it makes full perpendicular contact with the pinning holes. This differs from prior art ratcheting lever adjusters, where the retaining pin extends at an angle through the pinning holes, creating a greater shear force and thus increasing the risk of shearing. The outer tube pinning hole in prior art arrangements often had to be an elongate slot rather than a circular hole, due to the angle of the retaining pin on entering the hole. This forces the inner tube pinning holes to be adjusted past their pinning or rest positions to allow the pin to engage them, and then to drop back to their pinning position. This produces free play or delay in both adjustment directions, and also may producing jamming between the inner tube pinning hole and lever, potentially producing an unsafe condition and making the lever difficult to retract. The arrangement of this invention avoids these problems because the retaining pin is designed to enter both pinning holes in a direction perpendicular to the holes, avoiding any free play in the pinning position.

Preferably, the central portion of the lever is longer than either of the end portions, and the second end portion may be longer than the first end portion to provide a greater area for contact by a user's hands. The pivot bracket preferably comprises a pair of spaced parallel plates projecting outwardly from the outer tube, while the lever has a pair of downwardly projecting plates for engaging inside or outside the bracket plates, with a pivot pin extending through aligned openings in each of the plates. The biasing device preferably comprises a torsion spring mounted between the plates and acting against the second end portion of the lever so as to bias the first end portion towards the outer tube. Thus, both the pivot bracket and the biasing spring are hidden beneath the lever and risk of contact with or pinching of a user's hand or fingers is substantially reduced or eliminated.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which:

FIG. 1 is a perspective view illustrating a prior art ratcheting adjustment device for adjusting a seat pad or back pad of a chair or the like, with the lever in the inoperative position;

FIG. 1B is a perspective view of the prior art device of FIG. 1A, showing the lever in the operative position;

FIG. 2 is a perspective view of a ratcheting adjustment apparatus according to a preferred embodiment of the invention, with the parts shown separated;

FIG. 3 is a perspective view of the adjustment lever and pivot bracket of the apparatus of FIG. 2;

FIG. 4 is a perspective view of the lower side of the adjustment lever of FIGS. 2 and 3;

FIG. 5 is a cross-section through the apparatus illustrating the lever in the locked position securing the inner tube to the outer tube;

FIG. 6 is a perspective view of an exercise machine incorporating the adjustment of FIGS. 2 to 5 for adjusting the height of a seat pad;

FIG. 7 is a perspective view of the seat pad and adjustment apparatus of FIG. 6, with the parts shown separated;

FIG. 8 is a side elevational view of another type of exercise machine incorporating the adjustment apparatus of FIGS. 2 to 5 to adjust the position of a back pad;

FIG. 8A is an exploded view of the circled portion of the machine of FIG. 8, shown adjustment apparatus and back pad in more detail.

FIG. 9 is a perspective view of the ratcheting lever with end caps, with the end caps separated from the ends of the lever; and FIG. 10 is a perspective view of the ratcheting lever of FIG. 9 with the end caps in position over the opposite ends of the lever.

DESCRIPTION OF THE PREFERRED EMBODIMENT

FIGS. 1A and 1B of the drawings illustrates a prior art ratcheting adjustment device 10 which has been used in the past as a back pad or seat pad adjuster for the seat of an exercise machine or the like. The device 10 is mounted on an outer tube 12 of the adjustment system. As is conventional with such known ratcheting adjustment systems, an inner tube (not illustrated) extends telescopically through the outer tube 12, and has a series of spaced pinning holes. The outer tube 12 has a pinning hole 14 for alignment with a selected hole in the inner tube to control the extension of the inner tube and thus provide the desired seat pad or back pad position.

The adjustment device 10 comprises a lever 16 pivotally mounted between two pivot brackets 18 adjacent the pinning hole 14. When the lever is pivoted into the operative position of FIG. 1B, the end 20 of the lever extends through pinning hole 14 and into an aligned hole in the inner tube to lock the tube in a selected position.

There are a number of problems with the prior art arrangement of FIGS. 1A and 1B. The pivoting of the lever between two end plates or brackets 18 is a safety liability, because it creates a potential pinch area between the lever 16 and the plates 18. The user releases the lever by pressing down on the lower end 22 of the lever. Since the projecting end 22 is relatively short, the contact area for the user's hand is limited, increasing the risk of pinching. The lever is narrow, and does not provide a comfortable surface for pressing against, particularly when medical conditions preclude the use of fingers.

When the lever 16 is locked in the aligned holes in the outer and inner tube, it extends at an angle through the holes, so that it does not make full perpendicular contact with the holes. This increases the possibility of shearing.

FIGS. 2 to 5 illustrate a ratcheting adjustment apparatus according to a preferred embodiment of the present invention, which avoids or reduces the problems of the prior art arrangement described above. The apparatus is particularly intended for use in adjusting the seat pad and back pad position of a seat on an exercise machine, but it may be used in any device requiring a support of adjustable length. FIGS. 6 to 10 illustrate the apparatus assembled on two different types of exercise machine, although it will be understood that it may alternatively be used on the seats of any type of exercise machine, or for any seat where an adjustable seat pad and/or back pad is required.

The apparatus basically comprises an inner tube 30, an outer tube 32 telescopically engaged over the inner tube, and a lever assembly 34 for locking the inner tube 30 in a selected position relative to the outer tube. In the illustrated embodiment, the inner and outer tubes are of rectangular cross section, although other shapes such as square, circular, or other cross-sections may alternatively be used. Inner tube 30 has a series of spaced openings 36 extending along one side edge 38, while the outer tube 32 has a corresponding pinning opening 39 on the corresponding side edge 40.

The lever assembly 34 is shown with its parts separated in FIG. 2, and the assembled parts are illustrated in FIG. 3. The assembly basically comprises a lever 42 pivotally mounted on top of pivot bracket 44 via pivot pin 45, and a spring 46 for biasing the lever 42 into an operative position. The lever 42 comprises a generally flat, elongate plate-like member having a middle section 48, and end sections 49,50 each bent at an angle to the middle section 48. The middle section is longer than either end section, and end section 50 is longer than end section 49. A pinning button 52 projects perpendicularly from one face of end section 49.

A generally U-shaped, second pivot bracket 54 is welded to the lower face of the middle section 48 of the lever, as best illustrated in FIG. 4. Bracket 54 has a pair of spaced, generally triangular plates 56 which project downwardly from section 48 and have aligned pivot holes 58. Bracket 44 is of a U-shape corresponding to that of bracket 54, but is wider than bracket 54. Bracket 44 is welded to the side face 40 of the outer tube 32 adjacent pinning hole 39. Bracket 44 has a pair of spaced, generally triangular end plates 62 projecting outwardly from face 40 and spaced apart by a wider distance than plates 56, so that they can fit over the plates 56 when the parts are assembled. Plates 62 also have aligned pivot holes 64 for alignment with holes 58 on the first bracket. Pivot pin 45 extends through the aligned holes 58,64 in the two brackets to pivotally secure the lever 42 on top of bracket 44, as best illustrated in FIG. 3.

Tensioning spring 46 is designed to fit inside the mated U shaped brackets 44,54, with the pivot pin or shaft 45 extending through the center of the coiled portion of the spring to capture it on the shaft. One end 66 of the spring bears against the side edge 40 of the outer tube, while the opposite end 68 bears against the second end section 50 of the lever. Thus, spring 46 acts to bias the second end section 50 outwardly and away from the side edge 40 of the outer tube, such that the first end section 49 is biased inwardly and through the pinning hole 39. The tension spring 46 is designed to keep the angled first end section 49 of the lever in contact with, and flat against, the side edge or face 40 of the outer tube, as best illustrated in FIG. 5. In this position, the pinning button 52 extends in a perpendicular direction through the pinning hole 39 in the outer tube and an aligned hole 36 in the inner tube to lock the inner tube in position.

Inner tube 30 also has a recessed groove 70 in one face (the upper face as viewed in FIG. 2) on which a series of spaced numbers 72 or other indicia representing the respective pinning positions are imprinted. The outer tube 32 has a viewing hole 74 on the corresponding face 75 for position identification by viewing of the number on the inner tube which is currently visible.

As discussed above, the ratcheting adjustment apparatus of this invention may be used for adjusting the seat pad and/or back pad of a seat, such as the types of seat used on exercise machines. FIGS. 6 and 7 illustrate one possible arrangement of the apparatus for adjusting the height of a seat pad 80 on a bicep curl machine 82, while FIG. 8 illustrates another possible assembly of the apparatus for adjusting the position of a back pad 84 of an exercise machine 85 such as a leg extension machine. It will be understood that the apparatus may alternatively be used to adjust the seat pad and/or back pad of seats or chairs of other types of exercise machines in an equivalent manner, or to adjust other types of seats such as office chairs. The adjustment apparatus as illustrated in FIGS. 6 to 8 is identical to that of FIGS. 1 to 5, and like reference numerals have been used for like parts as appropriate.

In the arrangement of FIGS. 6 and 7, the outer tube 32 of the adjustment apparatus is welded to the end of a support strut 86 of the exercise machine frame so as to extend in a generally upright direction. The end of the inner tube 30 in turn is welded to a flat plate 88 which is bolted to the undersurface of seat pad 80, as best illustrated in FIG. 7. As illustrated in FIG. 7, the inner tube 30 has a slot 90 on its face 91 opposite groove 70. The outer tube 32 has an opening 92 aligned with slot 90 on its corresponding side face 94, and a retainer nut 95 extends through opening 92 for slidable engagement in slot 90. The opposite ends of slot 90 provide stops for limiting the movement of inner tube 30 through outer tube 32 and preventing the user from pulling the inner tube out of the outer tube.

In the embodiment illustrated in FIGS. 6 and 7, an additional glide sleeve 96 of smooth plastic or the like is mounted in the outer tube 32 to permit easy sliding movement of the inner tube 30 relative to the outer tube. Glide sleeve 96 has a hole 97 aligned with the pinning hole 39 in the outer tube. FIG. 6 illustrates the lever 42 in its operative position with the first end section 49 biased against the outer side edge or face 40 of the outer tube and the pinning button 52 extending transversely through pinning hole 39, hole 97 in the glide sleeve, and an aligned hole in the inner tube 30, locking the inner tube in a desired position corresponding to a comfortable height of seat pad 80. The lever may be readily released from the illustrated, locked position simply by pressing down on the relatively broad end section 50 of the lever with the fingers or palm of the hand, simultaneously lifting the opposite end section 49 away from side edge 40 and releasing the pinning button from the inner sleeve hole. This permits the lowering of seat pad 80 and inner tube 30. In order to raise the height of seat pad 80 and inner tube 30, the user simply lifts up the seat pad. Biasing spring 46 will bias the end section 49 toward the outer tube. The lower edge of each hole 36 will engage the lower portion of the button 52, forcing the lever to pivot out of the way in a ratcheting action and allowing the tube to adjust. As soon as a desired position is reached, the pad is released and will settle back down. The upper edge of the currently aligned hole 36 will therefore move downwardly, engaging the upper portion of button 52 and forcing the lever to pivot in the opposite or clockwise direction until the button is fully engaged through the hole. Thus, movement of the pad in a downwards direction will force the pinning button to engage through the aligned holes in a perpendicular direction, holding the pad in place. The seat is held securely in place, and spring tension prevents the pinning button from working loose.

FIGS. 8 and 8A illustrate an alternative configuration in which the adjustment apparatus is used to adjust the position of back rest 84 of a seat 100 in a leg extension exercise machine. The adjustment apparatus in this arrangement is identical to that of FIGS. 2 to 7, and like reference numerals have been used for like parts as appropriate.

In the configuration of FIG. 8, the outer tube 40 is secured to the upper end of an upright strut 102 forming part of the exercise machine support frame 104. The end of inner tube 30 is secured to a back plate 106 on which back pad 84 is mounted. As in the previous configuration, the lever 42 is moved into a locked position with the first end section 49 flat against the side face 40 of outer tube 32, and the pinning button 52 extending through the pinning hole 39 and an aligned hole 36 in the inner tube to lock the tubes together (see FIG. 5). Spring 46 biases the first end section in this position so that the pinning button is held securely in place against accidental dislodgement.

If the user wishes to adjust the back pad position rearward, they simply press down on the flat end section 50 of the lever, lifting the end section 49 away from the tube 32 and releasing the button 52 from the aligned holes in the inner and outer tubes. The inner tube is then free to move rearward relative to the outer tube, and can be moved along with the back pad 84 until a desired position is reached. In order to move forward, the user simply pulls the back pad. The button 52 bears against the side of the inner tube and ratchets into and out of the holes 36 as the back rest is adjusted to the left as viewed in FIG. 8. When a desired position is reached, a slight rearward motion will serve to force the button to fully engage through the pinning hole and aligned hole 36 in the inner tube, releasably locking the back pad in that position.

The ratcheting adjustment apparatus as described above has several advantages over prior art ratcheting adjusters. The broad, flat lever 42 is wider than the pivot brackets 44 it is mounted on, so that it extends over and covers the gap between the brackets 44, avoiding possible pinch areas. The lever 42 angles upward away from the outer tube when locked, providing easier accessibility to the operating end section 50 and further avoiding possible pinch areas. The pivot brackets 44 are as small as possible, while the lever 42 is relatively long. Preferably, as illustrated, the lever 42 is at least three times the length of the pivot brackets 44 over which it is mounted. This further reduces any risk of pinching between the lever and brackets as the lever pivots up and down.

The parallel angle design and overall width of the lever 42 provides a comfortable, flat surface on end section 50 for pressing against, either with the fingers or palm of the hand. The lever is designed to provide a larger, more comfortable contact area for adjustment purposes. The pinning button 52 is also of larger diameter than in prior art devices, and can therefore withstand larger shear loads. In a preferred embodiment of the invention, the diameter of the pinning button was around ½" and its length was 13/32". The overall length of the lever was around 5.5" and the length of the central section 48 was around 2.8" to 3.0". The length of the first end section 49 was around 1.2", and the length of the second end section 50 was about 1.6". The width of the lever varied from a maximum of 1.5" at the first end 49 to a minimum of 1" to 1.1" at the second end 50. Unlike some prior art arrangements, the angled design of the lever in this invention ensures that the pinning button 52 extends in a perpendicular direction through the pinning holes in the outer and inner tubes, as best illustrated in FIG. 5. Thus, the pinning button makes full perpendicular contact with each hole, further reducing the risk of shearing. The straight insertion of the button 52 through the holes allows for a tighter fit between the outside diameter of the pinning button and the inside diameter of the holes. This reduces the amount of play or movement by the inner adjusting tube before the ratcheting lever is actuated.

The width of the first end section 49 of the lever is greater than the pinning hole diameter, so that the lever completely covers the pinning hole when in the locked position. The tension spring 46 is fitted inside the mated U shaped brackets 44 and 54 on the outer tube and lever, respectively, and is trapped on the pivot shaft so that it cannot accidentally pop out. In this invention, the distance from the pivot point of the lever to the pinning hole, measured along the tube wall, is greater than the perpendicular distance of the pivot point from the tube wall. In prior art arrangements, the lever is typically pivoted farther out from the tube wall and closer to the pinning hole, so that the levers must enter the pinning holes at an angle, creating a greater shear force.

The adjustment apparatus provides an adjustable movement in a first direction, and an automatic and instantaneous position lock when movement in the first direction is stopped. The retainer nut and groove or slot engagement prevents the inner tube from pulling out of the outer tube and causing inconvenience to the user.

The lever of this invention will contact the side edge or wall 40 of the outer tube both in the locked and released positions. In the locked position, as illustrated in FIG. 5, the flat first end section 49 rests against the tube and over the pinning hole. When the second end section 50 is depressed to release the pinning button 52 and disengage the lever, the leading edge of the second end section will make contact with the tube. This prevents the lever from over-pivoting and reduces strain on the spring. Preferably, both end sections 49 and 50 of the lever are fitted with wear covers 110,112, respectively, as illustrated in FIGS. 9 and 10, to prevent any marring of the finish on the outer tube 32. Wear covers 110,112 are suitably of a softer material than the lever, which is metal, such as plastic or the like. The first wear cover 110 has a flat surface 114 with an opening 115 for fitting over button 52, and a pair of spring tabs 116 for snapping over the opposite side edges of the section 49 to hold the cover 110 in position, as illustrated in FIG. 10. The second wear cover 112 comprises a sleeve for slidable engagement over the second end section 50 of the lever.

The ratcheting lever adjustment apparatus of this invention is designed to automatically adjust or "ratchet" in a first direction, simply by lifting or pulling the seat or back pad, and has the ability to pin or hold the seat or back pad securely in place when pressure is placed against it in a second direction. Thus, when a desired position is reached, pressure of a user sitting on the seat pad or leaning on the back pad will be sufficient to urge the pinning button into full locking engagement with the pinning holes. If an adjustment in the second direction is desired, the lever is simply pivoted out of engagement with the inner tube and held while the tube is moved in the second direction. On release, the lever will be spring biased into engagement with the pinning holes.

The apparatus provides a simple, safe and user-friendly pad adjustment system. Adjustments are easier to make and the risk of the user's fingers being pinched accidentally is significantly reduced.

Although a preferred embodiment of the invention has been described above by way of example only, it will be understood by those skilled in the field that modifications may be made to the disclosed embodiment without departing from the scope of the invention, which is defined by the appended claims.

We claim:

1. An adjustment apparatus, comprising:

an inner tube having a series of spaced openings;

an outer tube telescopically engaged over the inner tube, the outer tube having a pinning opening for alignment with a selected one of the openings in the inner tube;

a pivot bracket of predetermined width mounted on the outside of the outer tube at a location spaced a predetermined distance from the pinning opening;

a lever having a central portion pivotally secured over the pivot bracket for rotation about a pivot axis, and opposite first and second end portions projecting in opposite directions from the central portion, the lever having a transverse width greater than the width of the pivot bracket, the first end portion of the lever projecting over the pinning hole;

a pinning button projecting from the first end portion towards the pinning hole, the lever being movable about said pivot axis between an operative position in which the pinning button extends through the pinning hole and an aligned hole in the inner tube to secure the tubes together, and a retracted position in which the pinning button is spaced from the pinning hole;

a biasing device urging the lever towards the operative position, the second end portion of the lever comprising a handle portion for pressing by a user to release the inner tube from the outer tube to permit relative movement between the tubes;

the central, first, and second end portions of the lever all being flat, the first end portion extending at a predetermined angle in a first direction from the central portion, and the second end portion extends at a predetermined second angle in a second direction from the central portion; and the first and second angles are the same and the first and second end portions are parallel;

the pinning button projecting in a direction perpendicular to the first end portion.

2. The apparatus as claimed in claim 1, wherein the first end portion is flat against the outer tube in the operative position and the pinning button extends in a perpendicular direction through the pinning hole and aligned hole in the inner tube.

3. The apparatus as claimed in claim 1, wherein the central portion of the lever is longer than each of the end portions.

4. The apparatus as claimed in claim 1, wherein the pivot bracket comprises a first pair of spaced end plates at a predetermined first spacing projecting outwardly from the outer tube, the plates having aligned pivot openings, the lever has a lower surface facing the outer tube, and a second pivot bracket projects from the lower surface of the central portion of the lever, the second pivot bracket comprising a second pair of spaced end plates at a predetermined second spacing different from the first spacing such that one of said pairs of end plates fits inside the other pair of end plates, the second pair of end plates having a second pair of aligned pivot openings for alignment with the first pair of pivot openings, and a pivot pin extends through the first and second pairs of aligned openings.

5. The apparatus as claimed in claim 4, wherein each pivot bracket comprises a U-shaped member having a central section secured to the outer tube and lever, respectively, and a pair of arms projecting from the central section and comprising said spaced end plates.

6. The apparatus as claimed in claim 4, wherein each end plate is of generally triangular shape and has an apex, the pivot openings being provided at the apex of the respective end plates.

7. The apparatus as claimed in claim 4, wherein said biasing device comprises a tension spring having a coiled central portion engaging over said pivot pin between said end plates, and opposite end portions projecting in opposite directions from said central portion and pivot brackets.

8. The apparatus as claimed in claim 7, wherein said spring end portions comprise a first portion acting against said outer tube adjacent said pinning hole, and a second portion acting against the second end portion of said lever to bias said lever towards said operative position.

9. The apparatus as claimed in claim 1, wherein the pivot axis is located at a first predetermined perpendicular distance from the outer tube and at a second predetermined distance from the pinning hole, the first distance being less than the second distance.

10. The apparatus as claimed in claim 1, including first and second wear covers for fitting over the first and second end portions, respectively, of the lever, the wear covers being of a softer material than that of the lever and outer tube.

11. The apparatus as claimed in claim 1, wherein the inner tube has an elongate guide slot of predetermined length, and a retaining pin projects inwardly from the outer tube for sliding engagement in the guide slot, whereby opposite ends of the guide slot provide stops for limiting movement of the inner tube relative to the outer tube in opposite directions.

12. The apparatus as claimed in claim 1, wherein the pinning hole is of predetermined diameter and the first end portion of the lever is of predetermined width greater than the pinning hole diameter, such that the lever completely covers the pinning hole when in the operative position.

13. An adjustment apparatus, comprising:

an inner tube having a series of spaced openings;

an outer tube telescopically engaged over the inner tube, the outer tube having a pinning opening for alignment with a selected one of the openings in the inner tube;

a lever pivotally secured to the outer tube for rotation about a pivot axis spaced outwardly from the tube, the lever having an intermediate portion and opposite first and second end portions projecting in opposite directions from the intermediate portion, the first end portion of the lever projecting over the pinning hole, and having a pinning member projecting from the first end portion towards the pinning hole;

the lever being rotatable about said pivot axis between an operative position in which the pinning member extends through the pinning hole and an aligned hole in the inner tube to secure the tubes together, and a retracted position in which the pinning member is spaced from the pinning hole; and a biasing device urging the lever towards the operative position, the second end portion of the lever comprising a handle portion for pressing by a user to release the inner tube from the outer tube to permit relative movement between the tubes; and each portion of the lever being flat and the first and second end portions being bent at a predetermined angle to the intermediate portion whereby the first end portion is flat against the tube in the operative position.

14. The apparatus as claimed in claim 13, wherein the intermediate portion is longer than each of the first and second end portions.

15. The apparatus as claimed in claim 13, wherein the pinning member projects from the first end portion in a direction perpendicular to said first end portion.

16. The apparatus as claimed in claim 13, including a pivot bracket of predetermined width secured to said outer tube, the lever being pivoted to said bracket, and the lever having a width greater than the width of said bracket.

17. The apparatus as claimed in claim 13, wherein said pinning hole is of predetermined diameter, and the first end portion of the lever has a predetermined width greater than the diameter of said pinning hole.

18. The apparatus as claimed in claim 13, including a pivot assembly pivot connecting the lever to the outer tube, the pivot assembly comprising a first pivot bracket projecting outwardly from said outer tube, a second pivot bracket projecting from the said lever towards said outer tube, the pivot brackets having aligned openings, and a pivot shaft projecting through said aligned openings to pivotally secure the second pivot bracket to the first pivot bracket.

19. The apparatus as claimed in claim 18, wherein each pivot bracket is U-shaped and has a central section secured to the respective outer tube and lever, and a pair of parallel end plates projecting from said central section, the spacing between the end plates of said first bracket being greater than the spacing between the end plates of said second bracket so that the second bracket can fit between the end plates of the first bracket, the end plates of both brackets having aligned openings and the pivot shaft extending through said aligned openings.

20. The apparatus as claimed in claim 18, wherein the pivot assembly is pivotally connected to the intermediate portion of the lever, and the pivot assembly is of predetermined length in a direction transverse to the pivot axis, the length of the intermediate portion of the lever being greater than the length of the pivot assembly.

21. The apparatus as claimed in claim 18, wherein the outer tube has a longitudinal axis, the pivot shaft is at a predetermined first distance from the outer tube in a direction perpendicular to the tube and longitudinal axis, and at a predetermined second distance from the pinning hole measured in a direction parallel to the longitudinal axis of the tube, the first distance being less than the second distance.

22. The apparatus as claimed in claim 13, wherein the first and second end portions of the lever extend substantially parallel to one another, whereby the second end portion is spaced outwardly and substantially parallel to the tube in the operative position.

23. An adjustment apparatus, comprising:
an inner tube having a series of spaced openings;
an outer tube telescopically engaged over the inner tube, the outer tube having a pinning opening for alignment with a selected one of the openings in the inner tube;
a lever pivotally secured to the outer tube for rotation about a pivot axis spaced outwardly from the tube, the lever having a pinning member projecting towards the pinning hole;

the lever being rotatable about said pivot axis between an operative position in which the pinning member extends through the pinning hole and an aligned hole in the inner tube to secure the tubes together, and a retracted position in which the pinning member is spaced from the pinning hole, whereby the pinning member ratchets in and out of holes in the inner tube when the outer and inner tubes are moved relative to one another in a first direction, and locks the inner and outer tubes against relative movement in a second direction opposite to the first direction; and the lever comprising a member having opposite, first and second flat end portions each having an outer end and a flat connecting portion extending between the end portions, the opposite end portions each being bent at a predetermined angle to the flat connecting portion, and the pinning member projecting in a direction perpendicular to the first end portion of the lever at a location spaced from the outer end of the first end portion.

24. The apparatus as claimed in claim 23, wherein the end portions extend parallel to one another and the first end portion engages flat against the outer tube in the operative position, the pinning button being of predetermined length less than the distance from the pivot axis to the pinning button, whereby the pinning button is inserted in a substantially straight direction through the pinning holes when the lever is moved between the retracted and operative positions.

* * * * *